(12) United States Patent
Wöhlte

(10) Patent No.: US 12,286,102 B2
(45) Date of Patent: *Apr. 29, 2025

(54) VEHICULAR DRIVING ASSIST SYSTEM WITH COLLISION AVOIDANCE

(71) Applicant: Magna Electronics Inc., Auburn Hills, MI (US)

(72) Inventor: Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/307,032

(22) Filed: Apr. 26, 2023

(65) Prior Publication Data

US 2023/0347878 A1 Nov. 2, 2023

Related U.S. Application Data

(60) Provisional application No. 63/363,651, filed on Apr. 27, 2022.

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 10/30* (2013.01);
(Continued)

(58) Field of Classification Search
CPC .. B60W 30/09; B60W 30/0956; B60W 10/18; B60W 10/20; B60W 10/30; B60W 50/16; B60W 50/14; B60W 2420/403; B60W 2420/408; B60W 2554/408; B60W 2540/20; B60W 2552/53; G08G 1/166; G08G 1/167; G06V 20/58
(Continued)

(56) References Cited

U.S. PATENT DOCUMENTS 5,550,677 A 8/1996 Schofield et al.
5,670,935 A 9/1997 Schofield et al.
(Continued)

FOREIGN PATENT DOCUMENTS

IN 201741056955 5/2019

*Primary Examiner* — Hai H Huynh
(74) *Attorney, Agent, or Firm* — HONIGMAN LLP

(57) ABSTRACT

A vehicular vision system includes a front camera disposed at a windshield of a vehicle equipped with the system and a side camera disposed at a side mirror of the vehicle. An electronic control unit (ECU) includes an image processor for processing image data captured by the cameras. The vehicular vision system, responsive to processing by the image processor of image data captured by the front camera, detects a leading vehicle traveling in front of the equipped vehicle in a traffic lane the equipped vehicle is also traveling along. The vehicular vision system, responsive to determination of an intent of the equipped vehicle to change lanes and to processing by the image processor of image data captured by the side camera, detects an oncoming vehicle traveling in a traffic lane adjacent to the traffic lane the equipped vehicle is traveling along.

21 Claims, 5 Drawing Sheets

(51) Int. Cl.
*B60W 10/20* (2006.01)
*B60W 10/30* (2006.01)
*B60W 30/095* (2012.01)
*B60W 50/16* (2020.01)
*G08G 1/16* (2006.01)

(52) U.S. Cl.
CPC ........ *B60W 30/0956* (2013.01); *B60W 50/16* (2013.01); *G08G 1/166* (2013.01); *B60W 2420/403* (2013.01); *B60W 2420/408* (2024.01); *B60W 2554/408* (2020.02)

(58) Field of Classification Search
USPC .................................................. 701/41–44
See application file for complete search history.

(56) References Cited

U.S. PATENT DOCUMENTS

| | | |
|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |
| 6,587,186 B2 | 7/2003 | Bamji et al. |
| 6,611,202 B2 | 8/2003 | Schofield et al. |
| 6,636,258 B2 | 10/2003 | Strumolo |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,842,687 B2 | 1/2005 | Winner et al. |
| 6,876,775 B2 | 4/2005 | Torunoglu |
| 6,882,287 B2 | 4/2005 | Schofield |
| 6,891,563 B2 | 5/2005 | Schofield et al. |
| 6,906,793 B2 | 6/2005 | Bamji et al. |
| 6,919,549 B2 | 7/2005 | Bamji et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,053,357 B2 | 5/2006 | Schwarte |
| 7,145,519 B2 | 12/2006 | Takahashi et al. |
| 7,157,685 B2 | 1/2007 | Bamji et al. |
| 7,161,616 B1 | 1/2007 | Okamoto et al. |
| 7,176,438 B2 | 2/2007 | Bamji et al. |
| 7,203,356 B2 | 4/2007 | Gokturk et al. |
| 7,205,904 B2 | 4/2007 | Schofield |
| 7,212,663 B2 | 5/2007 | Tomasi |
| 7,230,640 B2 | 6/2007 | Regensburger et al. |
| 7,248,283 B2 | 7/2007 | Takagi et al. |
| 7,283,213 B2 | 10/2007 | O'Connor et al. |
| 7,295,229 B2 | 11/2007 | Kumata et al. |
| 7,301,466 B2 | 11/2007 | Asai |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,013,780 B2 | 9/2011 | Lynam |
| 8,027,029 B2 | 9/2011 | Lu et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,036,026 B2 | 5/2015 | Dellantoni et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,090,234 B2 | 7/2015 | Johnson et al. |
| 9,092,986 B2 | 7/2015 | Salomonsson et al. |
| 9,126,525 B2 | 9/2015 | Lynam et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 9,575,160 B1 | 2/2017 | Davis et al. |
| 9,599,702 B1 | 3/2017 | Bordes et al. |
| 9,682,712 B2 | 6/2017 | Kubo |
| 9,689,967 B1 | 6/2017 | Stark et al. |
| 9,753,121 B1 | 9/2017 | Davis et al. |
| 9,869,762 B1 | 1/2018 | Alland et al. |
| 9,900,490 B2 | 2/2018 | Ihlenburg et al. |
| 9,954,955 B2 | 4/2018 | Davis et al. |
| 10,071,687 B2 | 9/2018 | Ihlenburg et al. |
| 10,099,614 B2 | 10/2018 | Diessner |
| 10,115,314 B2 | 10/2018 | Boegel |
| 10,214,157 B2 | 2/2019 | Achenbach et al. |
| 10,222,224 B2 | 3/2019 | Johnson et al. |
| 10,406,981 B2 | 9/2019 | Chundrlik, Jr. et al. |
| 10,457,209 B2 | 10/2019 | Byrne et al. |
| 10,787,125 B2 | 9/2020 | Achenbach et al. |
| 10,812,992 B1 | 10/2020 | Tran et al. |
| 10,866,306 B2 | 12/2020 | Maher et al. |
| 11,017,665 B1 | 5/2021 | Roy |
| 11,454,719 B2 | 9/2022 | Hess et al. |
| 11,763,410 B1 | 9/2023 | Roy |
| 12,030,501 B2 | 7/2024 | Solar et al. |
| 12,100,225 B2 | 9/2024 | Nix et al. |
| 2005/0179527 A1 | 8/2005 | Schofield |
| 2008/0192984 A1 | 8/2008 | Higuchi et al. |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0002873 A1 | 1/2013 | Hess |
| 2013/0141578 A1 | 6/2013 | Chundrlik, Jr. et al. |
| 2013/0215271 A1 | 8/2013 | Lu |
| 2013/0222592 A1 | 8/2013 | Gieseke |
| 2013/0222593 A1 | 8/2013 | Byrne et al. |
| 2013/0242099 A1 | 9/2013 | Sauer et al. |
| 2013/0258077 A1 | 10/2013 | Bally et al. |
| 2013/0278769 A1 | 10/2013 | Nix et al. |
| 2013/0297387 A1 | 11/2013 | Michael |
| 2013/0298866 A1 | 11/2013 | Vogelbacher |
| 2013/0300869 A1 | 11/2013 | Lu et al. |
| 2013/0314503 A1 | 11/2013 | Nix et al. |
| 2014/0005907 A1 | 1/2014 | Bajpai |
| 2014/0025240 A1 | 1/2014 | Steigerwald et al. |
| 2014/0028852 A1 | 1/2014 | Rathi |
| 2014/0049646 A1 | 2/2014 | Nix |
| 2014/0052340 A1 | 2/2014 | Bajpai |
| 2014/0067206 A1 | 3/2014 | Pflug |
| 2014/0085472 A1 | 3/2014 | Lu et al. |
| 2014/0098229 A1 | 4/2014 | Lu et al. |
| 2014/0104426 A1 | 4/2014 | Boegel et al. |
| 2014/0138140 A1 | 5/2014 | Sigle |
| 2014/0139676 A1 | 5/2014 | Wierich |
| 2014/0152825 A1 | 6/2014 | Schaffner |
| 2014/0160276 A1 | 6/2014 | Pliefke et al. |
| 2014/0160291 A1 | 6/2014 | Schaffner |
| 2014/0168415 A1 | 6/2014 | Ihlenburg et al. |

(56) References Cited

U.S. PATENT DOCUMENTS

| | | |
|---|---|---|
| 2014/0168437 A1 | 6/2014 | Rother et al. |
| 2014/0211009 A1 | 7/2014 | Fursich |
| 2014/0218529 A1 | 8/2014 | Mahmoud et al. |
| 2014/0218535 A1 | 8/2014 | Ihlenburg et al. |
| 2014/0226012 A1 | 8/2014 | Achenbach |
| 2014/0232869 A1 | 8/2014 | May et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0293042 A1 | 10/2014 | Lynam |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0159394 A1 | 6/2016 | Ryu et al. |
| 2016/0210853 A1 | 7/2016 | Koravadi |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0173239 A1 | 6/2018 | Yoon et al. |
| 2018/0231635 A1 | 8/2018 | Woehlte |
| 2019/0329627 A1* | 10/2019 | Chundrlik, Jr. ...... G06V 20/582 |
| 2019/0339382 A1 | 11/2019 | Hess et al. |
| 2020/0327343 A1 | 10/2020 | Lund et al. |
| 2021/0061276 A1 | 3/2021 | Zhang |
| 2021/0221390 A1 | 7/2021 | Slobodyanyuk et al. |
| 2021/0385865 A1 | 12/2021 | Mueck et al. |
| 2021/0392454 A1 | 12/2021 | Choi et al. |
| 2022/0024485 A1 | 1/2022 | Theverapperuma et al. |
| 2022/0097625 A1 | 3/2022 | Russell et al. |
| 2022/0255223 A1 | 8/2022 | Tran et al. |
| 2023/0286439 A1* | 9/2023 | Gali ..................... B60R 1/00 |
| 2024/0278736 A1 | 8/2024 | Lynam et al. |
| 2024/0359691 A1 | 10/2024 | Solar et al. |
| 2025/0014356 A1 | 1/2025 | Nix et al. |

\* cited by examiner

VEHICULAR DRIVING ASSIST SYSTEM WITH COLLISION AVOIDANCE

CROSS REFERENCE TO RELATED APPLICATION

The present application claims the filing benefits of U.S. provisional application Ser. No. 63/363,651, filed Apr. 27, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a front camera disposed at a windshield of a vehicle equipped with the vehicular vision system that views at least forward of the equipped vehicle through the windshield and captures image data. The system also includes a side camera disposed at a side mirror of the equipped vehicle and viewing at least forward and sideward of the equipped vehicle that captures image data. The front camera includes a CMOS imaging array with at least one million photosensors arranged in rows and columns. The side camera includes a CMOS imaging array with at least one million photosensors arranged in rows and columns. The system includes an electronic control unit (ECU) with electronic circuitry and associated software. The electronic circuitry of the ECU includes an image processor for processing image data captured by the front camera and image data captured by the side camera. The vehicular vision system, via processing at the ECU of image data captured by the front camera, determines a traffic lane along which the equipped vehicle is traveling. The vehicular vision system detects a leading vehicle traveling in front of the equipped vehicle in the traffic lane along which the equipped vehicle is traveling. Responsive to determination of an intent of the equipped vehicle to change from the traffic lane along which the equipped vehicle is traveling to an adjacent traffic lane that is adjacent to the traffic lane along which the equipped vehicle is traveling, the vehicular vision system, via processing at the ECU of image data captured by the side camera, detects an oncoming vehicle traveling in the adjacent traffic lane.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
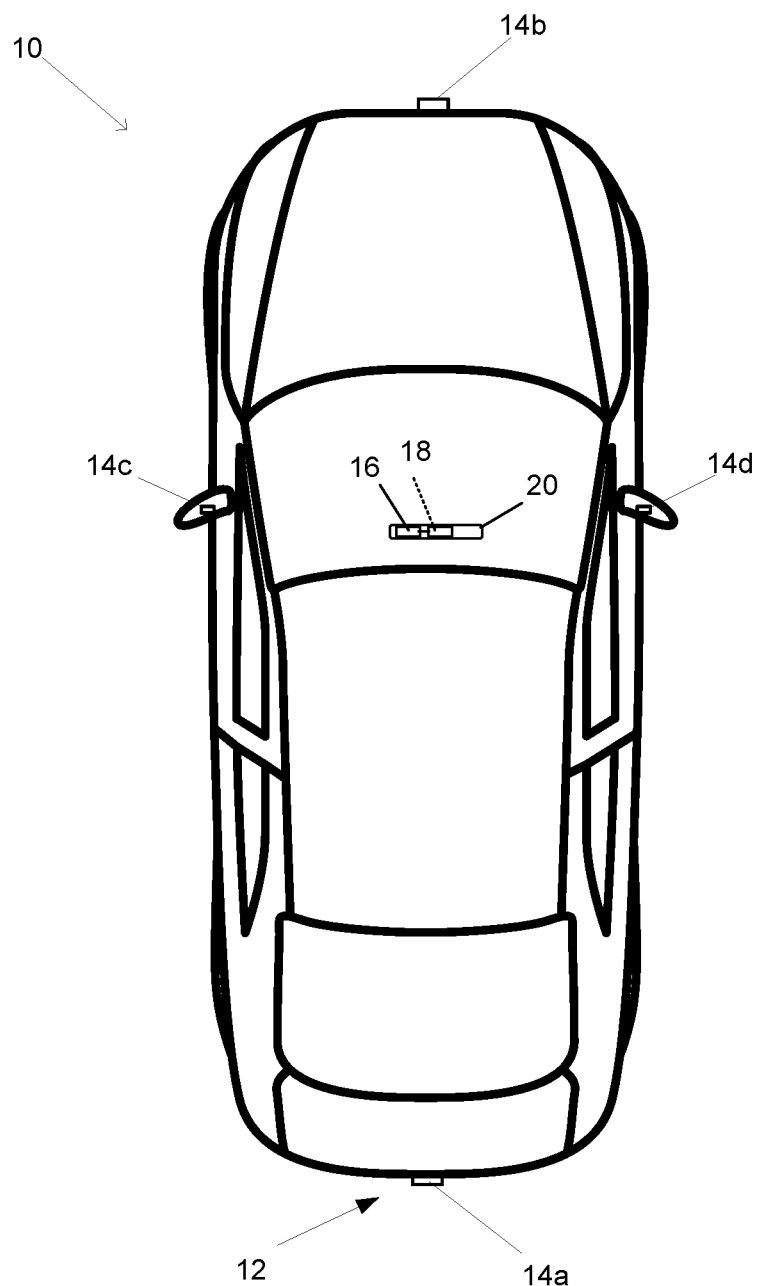
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

An overtaking maneuver is commonly defined as a traffic maneuver where a vehicle passes another vehicle traveling in the same direction. When travelling along a single-lane road, overtaking maneuvers involve temporarily driving in the same lane as oncoming traffic, increasing the risk of the maneuver.

Figure 2:
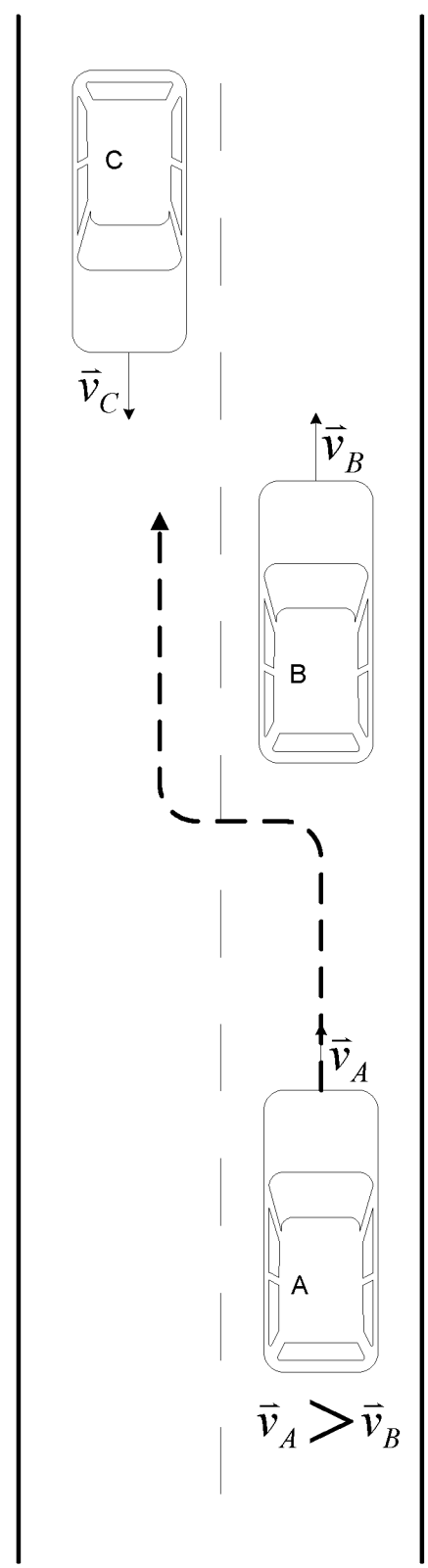
FIGS. 2 and 3 are schematic views of a vehicle performing an overtaking maneuver with an oncoming vehicle.
Figure 3:
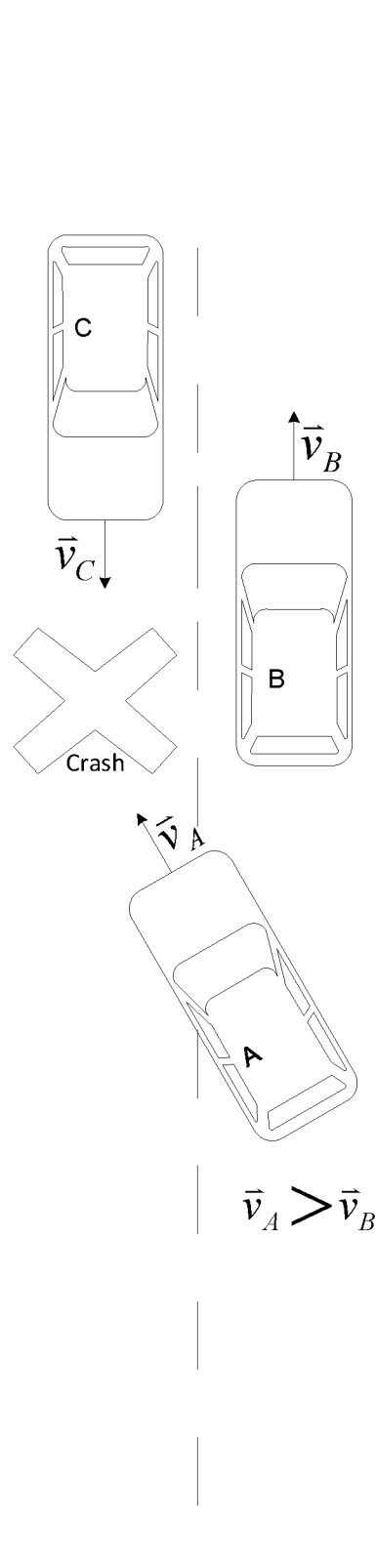

Implementations herein include an overtaking anti-collision assist system that assists in avoiding collisions with oncoming traffic during overtaking maneuvers. For example, as shown in FIG. 2, a first vehicle (vehicle A) is driving behind a second vehicle (vehicle B) in the same traffic lane of a multi-lane road (e.g., a two-lane road). Vehicle B may be any type of vehicle (e.g., a car, a truck, a motorbike, a bicycle, etc.). Vehicle A travels faster than Vehicle B (i.e., $V_A > V_B$) and begins an overtaking maneuver. However, a third vehicle (vehicle C) is oncoming on the opposite lane and vehicle A is unaware of vehicle C (e.g., vehicle C is obscured by vehicle A or the environment or the driver is distracted). As shown in FIG. 3, an overtaking maneuver is this situation may lead to a collision between vehicle A and vehicle C.

Figure 4:
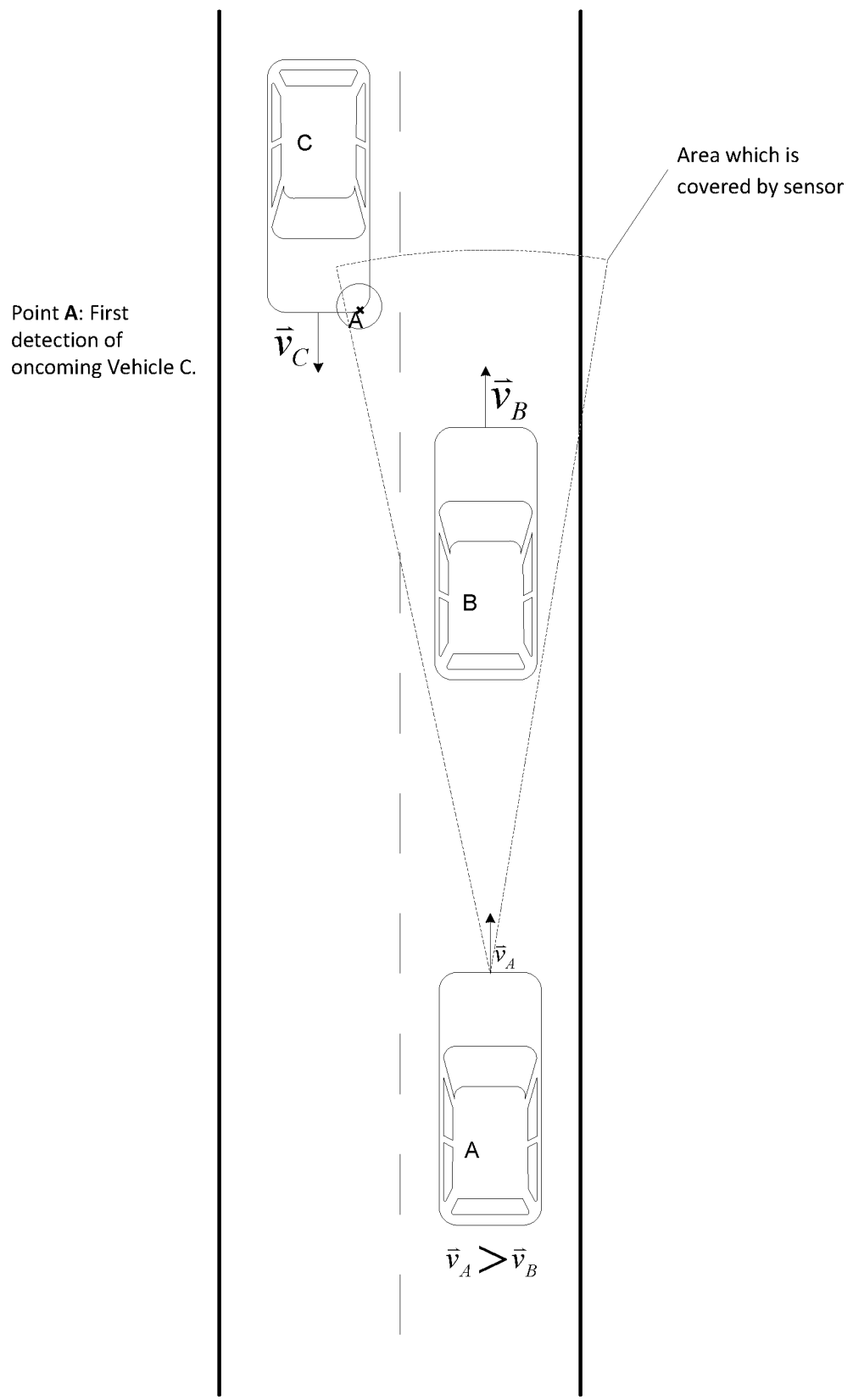
FIG. 4 is a schematic view of a vehicle detecting an oncoming vehicle with a sensor mounted at a bumper of the vehicle.
Figure 5:
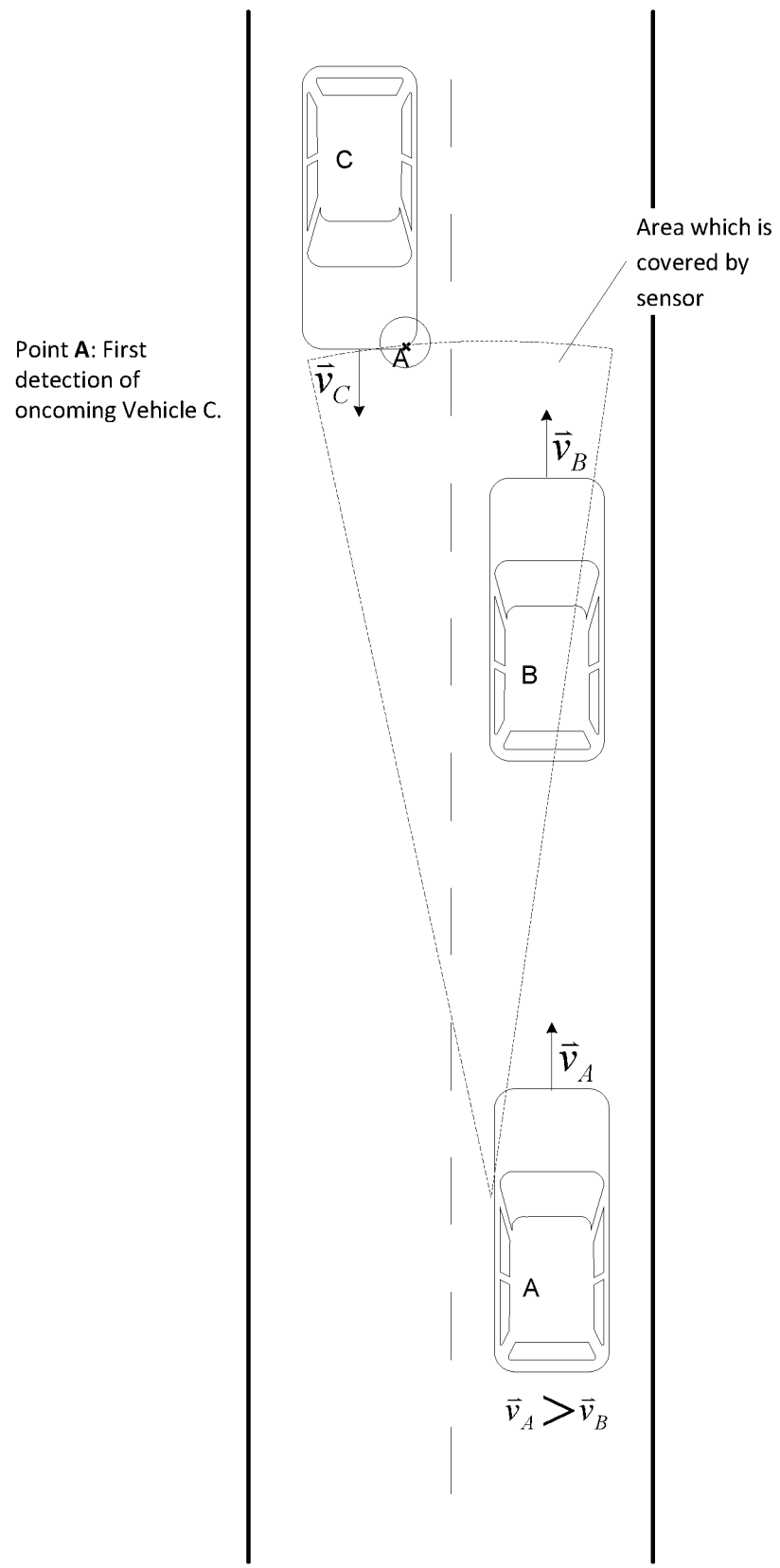
FIG. 5 is a schematic view of a vehicle detecting an oncoming vehicle with a sensor mounted at a side mirror of the vehicle.

Referring now to FIGS. 4 and 5, an advanced driver assistance system (ADAS) may include an imaging or ranging sensor (e.g., a camera, such as cameras 14a-d, a radar sensor, a LIDAR sensor, etc.) at a front or corner of the equipped vehicle (FIG. 4) or at a side mirror of the equipped vehicle (FIG. 5) to detect and recognize oncoming vehicles.

Based on sensor data captured by an imaging or non-imaging sensing sensor (e.g., a camera, a radar sensor, etc.), the ADAS may provide a message to the driver or the equipped vehicle and a crash avoidance routine (active or passive) may be started. For example, a passive crash avoidance routine may include generating a visual warning (e.g., on a display disposed within the vehicle, on a head-up display (HUD), etc.), generating an acoustic or audible warning, generating a haptic warning (e.g. vibration of steering wheel or seat), etc.

Additionally or alternatively, the system may include an active crash avoidance routine that, for example, disables or resists turning the steering wheel in direction of oncoming traffic to help stop the overtaking maneuver from beginning, slowing the vehicle or slowing or stopping a speed or acceleration of the vehicle, prefilling a brake (e.g., to prepare for emergency braking), tensioning a seat belt of one or more occupants of the vehicle, preparing airbags, etc.

Thus, the system can provide either or both an passive warning or actively attempt to reduce the likelihood of a collision or mitigate the consequence of a collision via controlling one or more systems of the vehicle (e.g., braking, steering, acceleration, seat belts, air bags, etc.).

The system may be used for left and right hand traffic (e.g., configurable via software). The forward sensing/imaging sensor can be mounted in different locations. For example, the sensor(s) may be mounted at or near the side mirrors (FIG. 5), at/in/behind the front bumper (FIG. 4), or behind the windshield as is common with front camera modules (FMCs). Each side mirror may include a camera and the system may use whichever camera is closer to oncoming traffic (i.e., the left side mirror camera in areas where vehicles drive on the right side of the road and the right side mirror camera in areas where vehicles drive on the left side of the road). The system may be configured (e.g., during manufacturing) to use sensors on one side of the vehicle versus another side. In other examples, the system automatically determines which sensor(s) to use (e.g., based on processing sensor data from each sensor, based on a location of a vehicle determined from a GPS sensor, etc.).

Mounting the sensors toward a side of the vehicle (e.g., at the side mirrors, at a corner of a bumper, etc.), may increase the field of view of the oncoming traffic lane. For example, as can be seen with reference to the field of view of the sensor in FIG. 4 and the field of view of the sensor in FIG. 5, the field of view of the sensor in FIG. 5 is able to view/detect the oncoming vehicle at a greater distance. The oncoming traffic can be any road user, such as cars, trucks, motorcycles, bicycles. Optionally, the system may be used to detect other objects that are not a vehicle but are otherwise blocking the lane and are a collision risk (e.g., pedestrians, animals, tree limbs, etc.).

The system may be used when traffic ahead of the equipped vehicle is slower than the equipped vehicle and the equipped vehicle desires to overtake. For example, vehicle B of FIGS. 2-4 may be parked or stopped. When the system detects that an oncoming vehicle poses a collision risk, the system may engage a steering lock or other system to inhibit the overtaking maneuver. The system may determine, via processing the sensor data captured by the forward-viewing sensor, that the oncoming object no longer poses a collision threat (e.g., the oncoming object turned or passed the equipped vehicle, and in response, the system may release the steering wheel lock or any other safety mechanism.

During operation, the system may detect at least two targets. For example, the system detects a first object moving in the same direction as the equipped vehicle (i.e., the leading vehicle) and at a second object travelling in the opposite direction (i.e., the oncoming vehicle). The sensor(s) (e.g., one or more cameras, one or more radar sensors, one or more LIDAR sensors, etc.) may work independent of other ADAS such as lane-keep assist systems and operate regardless of current lane markings and turn signals (i.e., without the driver indicating they are preparing to overtake).

The system may use multiple sensors. For example, the system may use a camera mounted at or behind a windshield of the vehicle in conjunction with a camera mounted at a side mirror of the vehicle and/or a radar sensor disposed at the front and/or at the front corner and/or side mirror of the vehicle. The system may use any form of sensor fusion to evaluate the sensor data from multiple sensors. The passive warning and/or the active interventions may be user-configurable. For example, the user may enable passive warnings (e.g., visual and/or audible alerts) and disable active interventions (e.g., steering and/or brake control). The system may detect a leading vehicle and/or the current traffic lane (e.g., lane markers) using a first sensor (e.g., a windshield-mounted camera) and may detect a leading vehicle in the current traffic lane via the first sensor and/or via a forward-sensing radar sensor, and may detect an oncoming vehicle in an adjacent traffic lane using a second sensor (e.g., a side-mounted camera, such as a camera mounted at a side mirror of the vehicle, or a sideward and forward sensing radar sensor, such as a radar sensor mounted at a front corner of the vehicle or at a side mirror of the equipped vehicle).

The system may always be engaged. That is, the passive warning and/or active interventions may always be active whenever the system determines an oncoming vehicle poses a collision risk during any potential overtake maneuver. In other examples, the system predicts or determines an upcoming overtake maneuver and only engages the passive warning and/or active interventions when the likelihood of an imminent overtake maneuver satisfies a threshold. For example, the system may determine an overtake maneuver based on an increase in speed in the equipped vehicle, a turn signal, lateral movement in the equipped vehicle, etc. The system may enable the passive warnings of the system whenever an oncoming vehicle is detected and enable active interventions only when the system determines the likelihood of a collision exceeds a threshold value.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S.

Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize other sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a front camera disposed at a windshield of a vehicle equipped with the vehicular vision system and viewing at least forward of the equipped vehicle through the windshield, the front camera capturing image data;
   a side camera disposed at a side mirror of the equipped vehicle and viewing at least forward and sideward of the equipped vehicle, the side camera capturing image data;
   wherein the front camera comprises a CMOS imaging array, and wherein the CMOS imaging array of the front camera comprises at least one million photosensors arranged in rows and columns;

wherein the side camera comprises a CMOS imaging array, and wherein the CMOS imaging array of the side camera comprises at least one million photosensors arranged in rows and columns;

an electronic control unit (ECU) comprising electronic circuitry and associated software;

wherein the electronic circuitry of the ECU comprises an image processor for processing image data captured by the front camera and image data captured by the side camera;

wherein the vehicular vision system, via processing at the ECU of image data captured by the front camera, determines a traffic lane along which the equipped vehicle is traveling;

wherein the vehicular vision system detects a leading vehicle traveling in front of the equipped vehicle in the traffic lane along which the equipped vehicle is traveling; and wherein, responsive to determination of an intent of the equipped vehicle to change from the traffic lane along which the equipped vehicle is traveling to an adjacent traffic lane that is adjacent to the traffic lane along which the equipped vehicle is traveling, the vehicular vision system, via processing at the ECU of image data captured by the side camera, detects an oncoming vehicle traveling in the adjacent traffic lane.

2. The vehicular vision system of claim 1, wherein the vehicular vision system, responsive to determining the intent to change from the traffic lane and detecting the oncoming vehicle, generates an alert to an operator of the equipped vehicle.

3. The vehicular vision system of claim 2, wherein the alert comprises at least one selected from the group consisting of (i) a visual alert, (ii) an audible alert, and (iii) a haptic alert.

4. The vehicular vision system of claim 1, wherein the vehicular vision system, responsive to detecting the leading vehicle and the oncoming vehicle, enables an active crash avoidance function.

5. The vehicular vision system of claim 4, wherein the active crash avoidance function comprises at least one selected from the group consisting of (i) restricting steering of the equipped vehicle, (ii) restricting a speed of the equipped vehicle, (iii) restricting an acceleration of the equipped vehicle, (iv) prefilling a brake of the equipped vehicle, and (v) tensioning a seat belt of the equipped vehicle.

6. The vehicular vision system of claim 4, wherein the vehicular vision system, responsive to determining that the oncoming vehicle has passed the equipped vehicle, disables the active crash avoidance function.

7. The vehicular vision system of claim 4, wherein the vehicular vision system enables the active crash avoidance function responsive to determining that a likelihood of a collision between the equipped vehicle and the oncoming vehicle is greater than a threshold.

8. The vehicular vision system of claim 1, comprising a radar sensor disposed at a bumper of the equipped vehicle.

9. The vehicular vision system of claim 8, wherein the vehicular vision system detects the oncoming vehicle via processing of sensor data captured by the radar sensor.

10. The vehicular vision system of claim 1, wherein the vehicular vision system determines the intent to change from the traffic lane based on at least one selected from the group consisting of (i) an acceleration of the equipped vehicle, (ii) a turn signal of the equipped vehicle, and (iii) a lateral movement of the equipped vehicle.

11. The vehicular vision system of claim 1, wherein the vehicular vision system detects the oncoming vehicle at least in part via processing of lidar data captured by at least one lidar sensor of the equipped vehicle.

12. The vehicular vision system of claim 1, wherein the vehicular vision system detects the leading vehicle at least in part via processing of radar data captured by at least one radar sensor of the equipped vehicle.

13. A vehicular vision system, the vehicular vision system comprising:

a front camera disposed at a windshield of a vehicle equipped with the vehicular vision system and viewing at least forward of the equipped vehicle through the windshield, the front camera capturing image data;

a side camera disposed at a side mirror of the equipped vehicle and viewing at least forward and sideward of the equipped vehicle, the side camera capturing image data;

wherein the front camera comprises a CMOS imaging array, and wherein the CMOS imaging array of the front camera comprises at least one million photosensors arranged in rows and columns;

wherein the side camera comprises a CMOS imaging array, and wherein the CMOS imaging array of the side camera comprises at least one million photosensors arranged in rows and columns;

an electronic control unit (ECU) comprising electronic circuitry and associated software;

wherein the electronic circuitry of the ECU comprises an image processor for processing image data captured by the front camera and image data captured by the side camera;

wherein the vehicular vision system, via processing at the ECU of image data captured by the front camera, determines a traffic lane along which the equipped vehicle is traveling;

wherein the vehicular vision system detects a leading vehicle traveling in front of the equipped vehicle in the traffic lane along which the equipped vehicle is traveling;

wherein, responsive to determination of an intent of the equipped vehicle to change from the traffic lane along which the equipped vehicle is traveling to an adjacent traffic lane that is adjacent to the traffic lane along which the equipped vehicle is traveling, the vehicular vision system, via processing at the ECU of image data captured by the side camera, detects an oncoming vehicle traveling in the adjacent traffic lane;

wherein the vehicular vision system determines the intent to change from the traffic lane based on at least one selected from the group consisting of (i) an acceleration of the equipped vehicle, (ii) a turn signal of the equipped vehicle, and (iii) a lateral movement of the equipped vehicle; and wherein the vehicular vision system, responsive to determining the intent to change from the traffic lane and detecting the oncoming vehicle, generates an alert to an operator of the equipped vehicle.

14. The vehicular vision system of claim 13, wherein the alert comprises at least one selected from the group consisting of (i) a visual alert, (ii) an audible alert, and (iii) a haptic alert.

15. The vehicular vision system of claim 13, comprising a radar sensor disposed at a bumper of the equipped vehicle.

16. The vehicular vision system of claim 15, wherein the vehicular vision system detects the oncoming vehicle via processing of sensor data captured by the radar sensor.

17. A vehicular vision system, the vehicular vision system comprising:
a front camera disposed at a windshield of a vehicle equipped with the vehicular vision system and viewing at least forward of the equipped vehicle through the windshield, the front camera capturing image data;
a side camera disposed at a side mirror of the equipped vehicle and viewing at least forward and sideward of the equipped vehicle, the side camera capturing image data;
wherein the front camera comprises a CMOS imaging array, and wherein the CMOS imaging array of the front camera comprises at least one million photosensors arranged in rows and columns;
wherein the side camera comprises a CMOS imaging array, and wherein the CMOS imaging array of the side camera comprises at least one million photosensors arranged in rows and columns;
an electronic control unit (ECU) comprising electronic circuitry and associated software;
wherein the electronic circuitry of the ECU comprises an image processor for processing image data captured by the front camera and image data captured by the side camera;
wherein the vehicular vision system, via processing at the ECU of image data captured by the front camera, determines a traffic lane along which the equipped vehicle is traveling;
wherein the vehicular vision system detects a leading vehicle traveling in front of the equipped vehicle in the traffic lane along which the equipped vehicle is traveling;
wherein, responsive to determination of an intent of the equipped vehicle to change from the traffic lane along which the equipped vehicle is traveling to an adjacent traffic lane that is adjacent to the traffic lane along which the equipped vehicle is traveling, the vehicular vision system, via processing at the ECU of image data captured by the side camera, detects an oncoming vehicle traveling in the adjacent traffic lane; and
wherein the vehicular vision system, responsive to determining the intent to change from the traffic lane and detecting the oncoming vehicle, controls at least one of (i) steering of the equipped vehicle to avoid the leading vehicle and the oncoming vehicle and (ii) braking of the equipped vehicle to avoid the leading vehicle and the oncoming vehicle.

18. The vehicular vision system of claim 17, wherein the vehicular vision system, responsive to determining the intent to change from the traffic lane and detecting the oncoming vehicle, restricts acceleration of the equipped vehicle.

19. The vehicular vision system of claim 17, wherein the vehicular vision system, responsive to determining that the oncoming vehicle has passed the equipped vehicle, ceases controlling the at least one of (i) steering of the equipped vehicle and (ii) braking of the equipped vehicle.

20. The vehicular vision system of claim 17, wherein the vehicular vision system, responsive to determining the intent to change from the traffic lane and detecting the oncoming vehicle, generates an alert to an operator of the equipped vehicle.

21. The vehicular vision system of claim 17, wherein the vehicular vision system determines the intent to change from the traffic lane based on at least one selected from the group consisting of (i) an acceleration of the equipped vehicle, (ii) a turn signal of the equipped vehicle, and (iii) a lateral movement of the equipped vehicle.

* * * * *